Patented Dec. 28, 1937

2,103,445

UNITED STATES PATENT OFFICE 2,103,445

REFINING OF ROSIN ESTERS

Joseph N. Borglin, Wilmington, Del., assignor to Hercules Powder Company, Wilmington, Del., a corporation of Delaware No Drawing. Application November 2, 1931, Serial No. 572,731
Renewed September 22, 1934

15 Claims. (Cl. 260—99.40)

This invention relates to an improved method for refining rosin esters and more especially for removing color bodies from esters prepared from low grade rosins.

Wood and gum rosins consist primarily of abietic acid, but contain impurities of varying amounts, these impurities including both visible and latent color bodies, the latter, while not primarily influencing the color of freshly refined rosin, tending to darken on aging, especially in the presence of oxygen and an alkali. These latent color bodies are found to a small extent in certain low grades of gum rosin and generally in wood rosin. When esters are prepared from rosins containing either visible or latent color bodies, the color bodies appear in the esters, being ordinarily removable therefrom only by distillation, a process not usually feasible except with the lower aliphatic esters such as ethyl abietate.

The broad object of the present invention relates to the removal of color bodies both visible and latent, from rosin esters by the use of selective solvents exhibiting high solvent power for the color bodies as compared with a solvent in which the ester is dissolved for treatment. Briefly, the process involves the treatment of a solution of ester by extracting the same with a solvent which, either at all times or under certain conditions, is immiscible with the ester solution.

When iron is absent from the esters, the extraction of the color bodies may be effected by the same general class of solvents as are usable in the removal of color bodies from rosins. On the other hand, when the esters are contaminated with any appreciable amounts of iron, resulting, for example, from esterfication in iron apparatus, these selective solvents are of substantially reduced effectiveness. It is found that in case iron is present the effectiveness of the extraction may be increased, even above the normal degree when iron is absent, by the preliminary, simultaneous, or subsequent treatment of the rosin ester by certain substances, the majority of which fall into the category of reducing agents. Even though iron is absent, the use of these additional substances frequently results in the improvement of the quality of the product or the reduction of the amount of extracting agent necessary to give some certain yield of refined product.

In the preferred methods of carrying out the invention, the ester, if free from iron, is dissolved in some suitable medium, such as gasoline, petroleum ether, naphtha, kerosene, or the like, and the liquid solvent of the color bodies, is added to the solution and brought into intimate contact therewith by agitation of the mixture at a temperature at which the liquids are substantially immiscible, or by the formation of a homogeneous solution through elevation of the temperature of the mixture. Intimate contact of the liquid solvent of the color bodies, with the ester solution permits the extracting liquid to selectively dissolve the color bodies, the greater part of the ester, at least, remaining in solution in the liquid solvent thereof. After effecting intimate contact between the liquids, they are permitted to separate, after reduction of temperature, if they were put into solution or in any event if rapidity and completeness of separation is desired. As a result of the separation of the two liquids, one will contain essentially the ester in solution and the other will contain essentially the color bodies in solution. The ester, refined and freed from the color bodies dissolved in the liquid solvent thereof, may be readily recovered by evaporating the solvent from the separated ester solution.

Alternatively, where the liquid solvent of the color bodies, is also a solvent of the ester, the ester containing the color bodies may be dissolved in the liquid, and another immiscible liquid, solvent of the rosin but less solvent of the color bodies, added. The two liquids are in this case, also, intimately contacted and then separated, contact being effected by agitation at a temperature at which they are substantially immiscible, or by the formation of a homogeneous solution through elevation of the temperature of the mixture. The ester is recovered from the solution in the liquid preferentially solvent of the ester.

In general, in carrying out the process, the color bodies are somewhat soluble in the liquid used primarily as an ester solvent, and the ester is somewhat soluble in the extracting liquid. As a result after admixture of the liquids and subsequent separation both the color bodies and ester are distributed between the solutions in accordance with the usual laws; that is, the relative amount of each in unit volumes of the two solutions will bear ratios proportional to their solubilities in the respective solvents. As is usual, therefore, complete extraction can only be attained by repeated treatments with, of course, some loss of ester. Furthermore, each solvent dissolves some of the other with a resulting increased tendency to dissolve a larger amount of the undesired substance. Since the mutual solubilities of the solvents in each other is decreased in general with decrease in temperature, most effective separation of the liquids is possible at lowered temperatures. As noted above, intimate admixture is sometimes produced by raising the temperature to a point where one liquid is completely soluble in the other to form a homogeneous mixture. Cooling to refrigeration temperatures may in such cases be necessary to obtain good separation.

When iron is substantially absent, the manipulation involved may take the form of any of the manipulations outlined in the patent to Kaiser and Hancock, No. 1,715,088, dated May 28, 1929; also, the selective solvents may be the same in general, for example, furfural, furfuryl alcohol, aniline, liquid sulphur dioxide, phenol, resorcinol, or other phenols, chlorohydrins, such as ethylene chlorohydrin, alkali iodides, stannic chloride, or the like, or operable equivalents therefor. Of course, since the various esters differ in solubilities in the selective solvents, there is chosen for treatment of any particular ester, a solvent in which it is least soluble. The selective solvent materials may be used either alone or, especially if solid, in solution in inert solvents.

If iron is present in an ester, due, for example, to its preparation in iron apparatus, good results require some modification of the simple extraction methods outlined above. Briefly, the modification involves the use, in addition to the extracting solvent, of agents among which may be listed oxalic acid, boric acid, alkali metal hydrosulphites including ammonium hydrosulphite, etc. These agents may be used in several alternative manners. First, the agent, such as oxalic acid, in suitable solution, for example, in alcohol, may be agitated or refluxed with the ester solution, the solution of agent withdrawn, and then the ester solution may be extracted with a selective solvent in the ordinary manner as outlined above.

Secondly, the agent may be used simultaneously with the selective solvent. For example, resorcinol, or phenol, and oxalic acid in admixture may be refluxed with a gasoline solution of the ester.

As a third alternative procedure, extraction in the ordinary manner may first be carried out followed by treatment of the ester solution with the agent. For example, aniline and an ester solution in gasoline may be heated to solution, cooled, and the aniline withdrawn. The ester solution may then be agitated and heated with an alcoholic solution of oxalic acid. It may be pointed out that the last example illustrates the type of procedure which must be adopted when the selective solvent and agent may not be mixed and used together. Aniline and oxalic acid react to form a salt and hence treatment with oxalic acid must either precede or follow treatment with aniline. The same is true in the case of other acidic and basic substances or other incompatible combinations such as stannic chloride and sodium hydrosulphite.

As will be obvious, iron present in the rosin ester due, for example, to preparation of the ester in iron apparatus, will be present in the ferric form, which has a yellowish color and will correspondingly tinge the ester. As will be equally obvious, oxalic acid, boric acid, alkali metal hydrosulphites including ammonium hydrosulphite, etc. will act to convert ferric iron to the ferrous form, which is colorless.

To illustrate the refining methods indicated above, there may be cited various purification processes used upon different rosin esters. In the first instance the refining of esters from which iron was absent will be considered. In the various processes listed below the rosin esters graded B in color. Glycol esters were treated as follows:

1. 300 grams of a 14% solution of glycol ester in gasoline and 40 grams of furfural were refluxed for one hour, cooled and separated. By evaporation of the gasoline solution, a 36% yield of glycol ester grading H in color was recovered.

2. 300 grams of the same gasoline-glycol solution and 40 grams of resorcinol were refluxed for one hour. The yield was 21% of glycol ester grading I in color.

3. 300 grams of the same gasoline-glycol ester solution, 14 grams of resorcinol and 1 gram of oxalic acid were refluxed for one hour. In this case a 50% yield of ester grading I in color was recovered.

4. 300 grams of the same gasoline-glycol ester solution and 30 grams of phenol were refluxed to solution and then cooled to 15° C. in order to effect separation of the phenol from the gasoline solution. A 45% yield of ester grading H in color was obtained.

5. A process similar to No. 4 above but substituting 30 grams of aniline for the phenol gave a 63% yield grading H in color.

6. 300 grams of the same gasoline-glycol ester solution was shaken with 40 grams of a saturated alcoholic solution of oxalic acid at room temperature. A 78% yield of ester grading F in color was recovered.

7. A process carried out similar to No. 6 above with the substitution of 40 grams of a 50% solution of stannic chloride in alcohol for the oxalic acid solution of the previous process, yielded 55% of ester grading F in color.

8. A further similar process to No. 6, substituting 30 grams of a saturated alcoholic solution of sodium iodide gave a 54% yield of ester grading G in color.

9. 300 parts of a 14% solution of glycol ester, prepared from ethylene dichloride and sodium resinate and grading D in color, were refluxed with 14 parts of resorcinol and 1 part of oxalic acid for one hour, the mixture being then cooled to room temperature and the purified gasoline solution decanted and evaporated. An 88% yield of N glycol ester was obtained.

10. A process similar to that of No. 9, using 1 part of sodium hydrosulphite in place of the oxalic acid gave an 87% yield of ester grading N in color.

11. 300 parts of a 14% gasoline solution of glycol ester, prepared by refluxing glycol and FF wood rosin with p-toluene sulphonic acid as the catalyst, and 40 parts of furfural were heated to solution, cooled to 0° C. and the purified ester solution decanted and evaporated. A 36% yield of H ester was obtained.

12. 300 parts of the same glycol ester solution used in No. 11 were refluxed with 40 parts of resorcinol for one hour, the mixture being cooled to room temperature and the gasoline solution of purified ester evaporated. A 21% yield of I ester was recovered.

13. 300 parts of the gasoline-ester solution of the two preceding examples were refluxed for one hour with 14 parts of resorcinol and one part of oxalic acid. A 50% yield of ester grading I in color resulted.

Similar processes carried out with glycerin esters grading B in color, were as follows:

1. 56 grams of glycerin ester, dissolved in gasoline to a 14% solution, and 56 grams of phenol were heated to solution. 12 grams of water were then added and the mixture allowed to cool. After separation the gasoline solution was evaporated and a 62% yield of H glycerin ester was recovered.

2. 300 grams of the 14% solution of glycerin ester mentioned above and 34 grams of resorcinol were refluxed for one-half hour, cooled to room temperature, the gasoline solution washed with 100 cc. of 80% alcohol followed by 100 cc. of water and evaporated. A 54% yield of I glycerin ester was obtained.

3. 300 grams of the same gasoline solution and 15 grams of resorcinol and 1 gram of oxalic acid were treated as in the preceding example. The yield was 71% of H ester.

4. A process similar to the preceding with the substitution of 1 gram of boric acid for the oxalic acid yielded 81% of I ester.

5. Another process similar to No. 3, with the substitution of 1 gram of sodium hydrosulphite for the oxalic acid gave a 74% yield of H ester.

6. 300 grams of the 14% solution of glycerin ester in gasoline was given two 30 gram extractions with furfural and cooled to 0° C. after each extraction. A 68% yield of H glycerin ester was recovered.

7. 300 grams of the same solution, 20 grams of resorcinol and 1 gram of oxalic acid were refluxed for one-half hour, cooled to 15° C. and washed with 80% alcohol, followed by water. The yield was 73% of ester grading H in color.

8. 300 grams of the above solution of glycerin ester and 40 grams of phenol were heated to solution. 10 grams of water were then added to facilitate separation and the mixture cooled to 0° C. 53% of H glycerin ester was obtained.

9. In a process carried out with glycerin ester of rosin grading D in color, 25 parts of the ester were dissolved in 150 parts of gasoline and refluxed for two hours with 20 parts of resorcinol. After cooling to room temperature the purified gasoline solution of ester was decanted, water washed and evaporated. A 54% yield of I glycerin ester was obtained.

10. 300 parts of the glycerin ester solution of the preceding example, 14 parts of resorcinol and 1 part of oxalic acid were refluxed for one hour, cooled to room temperature, the purified gasoline solution of ester decanted and the solvent evaporated. A 71% yield of glycerin ester grading H in color was recovered.

11. In a process similar to the preceding, with the substitution of 1 part of boric acid for the oxalic acid, an 81% yield of ester grading I in color was obtained.

12. A further similar process, substituting 1 part of sodium hydrosulphite for the oxalic acid, gave a 74% yield of H ester.

13. 40 parts of the glycerin ester of rosin grading D in color were dissolved in gasoline to a 14% solution and heated with 40 parts of furfural, the mixture being then cooled to 0° C. and the purified gasoline solution decanted and evaporated. A 77% yield of G ester was obtained.

Processes carried out by treatment of ethyl abietate grading B in color were as follows:

1. 30 grams of the crude ethyl abietate were dissolved in gasoline to form a 14% solution and heated with 30 grams of furfural for one-half hour. This was followed by cooling to 15° C., separation and evaporation. 85% of the ethyl abietate, grading K in color was recovered.

2. The same solution as in the preceding example was refluxed with 10 grams of resorcinol and .5 gram oxalic acid for one hour. The mixture was cooled to room temperature and the gasoline solution washed with 100 cc. of 80% alcohol followed by water. A 91.5% yield of K ethyl abietate was obtained.

From the above examples, it will be seen that the various selective solvents used for the purification of rosins may also be used for the purification of esters. By the use of reducing agents, such as oxalic acid or sodium hydrosulphite ($Na_2S_2O_4$), the yields are found to be improved in both quantity and color even though, as in the preceding examples, the use of these substances is not rendered necessary by the presence of iron. In case iron is present the use of the various selective solvents alone is far less effective to produce practical refining, the yields of high grade products being small and only obtainable after repeated treatments. However, in case iron is present the use of oxalic acid, sodium hydrosulphite, or the like, will result in proper purification with high yields. This is illustrated by the following examples of processes carried out on glycol esters and glycerin esters which contained iron.

As examples of processes involving the treatment of glycol esters containing iron, the following may be cited:

1. 300 grams of a 15% solution of glycol ester in gasoline grading B in color and 30 grams of furfural were heated to solution, cooled to 15° C. and the spent furfural was drawn off. The resulting solution was heated with 25 grams of a saturated alcoholic solution of oxalic acid. A yield of 65% of the glycol ester grading H in color was recovered.

2. 300 grams of the same ester-gasoline solution and 45 grams of resorcinol were refluxed for one hour, cooled to 15° C. the gasoline solution decanted from the spent resorcinol and the gasoline solution then heated for a few minutes with 25 grams of a saturated alcoholic oxalic acid solution. This gave a 53% yield of K ester.

3. A process similar to No. 2, except that the resorcinol was dissolved in 30 grams of alcohol and the alcoholic oxalic acid solution was added during the refluxing, giving simultaneous treatment, produced a 70% yield of glycol ester of grade K.

4. A process similar to No. 2, except that .5 gram of oxalic acid was added to the resorcinol without solution in alcohol, yielded 88% of glycol ester of grade N. Here again the treatment was simultaneous.

5. 300 grams of the glycol ester-gasoline solution and 45 grams of phenol were heated to solution. 10 grams of water were then added and the mixture cooled to 15° C. The separated gasoline solution was then heated with 25 grams of a saturated alcoholic solution of oxalic acid. 65% H ester was recovered.

6. In a process carried out similar to No. 5 anil'ne was substituted for the phenol. A 61% yield of I glycol ester was obtained.

7. 300 grams of the glycol ester-gasoline solution and 70 grams of saturated alcoholic solution of oxalic acid were heated for one-half hour, cooled to 15° C. and the spent alcoholic oxalic acid solution drawn off. Evaporation gave a 60% yield of H glycol ester.

8. 300 grams of the ester solution, 14 grams of resorcinol and 1 gram of sodium hydrosulphite were refluxed for one hour, the mixture cooled to room temperature, the gasoline solution drawn off, washed with 100 cc. of 80% alcohol followed by water and evaporated. This gave an 87% yield of glycol ester grading N in color.

9. 300 grams of the ester solution, 14 grams of resorcinol and .5 gram of sodium hydrosulphite were refluxed for one-half hour, cooled to 15° C. and washed with 100 cc. of 80% alcohol followed by water. The recovery was 87% of N glycol ester.

10. Substituting phenol for the resorcinol in the process indicated at 8 gave a 52% yield of G glycol ester.

The following examples illustrate the process as applied to a glycerin ester grading B in color containing iron:

1. 300 grams of a 14% solution of the glycerin ester in gasoline and 50 grams of a saturated alcoholic sodium iodide solution were shaken at room temperature, the alcoholic solution drawn off and the gasoline solution heated with a saturated alcoholic solution of oxalic acid. The mixture was then cooled to room temperature, the alcoholic solution drawn off and the gasoline solution washed with water. A 58% solution of F glycerin ester resulted.

2. 300 grams of the glycerin ester solution and 25 grams of a saturated alcoholic oxalic acid solution were refluxed for one-half hour, the spent alcoholic solution drawn off and the resulting gasoline solution washed with 80% alcohol followed by water. 50 grams of furfural were then added and heated to solution, the mixture being later cooled to 15° C. and separation effected. Glycerin ester grading H in color in the amount of 73% was yielded.

3. 300 grams of the glycerin ester solution, 30 grams of resorcinol and .5 gram of oxalic acid were refluxed for one-half hour, cooled to 15° C. and washed with 80% alcohol followed by water. A 72% yield of glycerin ester grading H in color resulted.

4. A process carried out as indicated in No. 3 above, except that the resorcinol was dissolved in 10 cc. of alcohol, gave a 70% yield of H ester.

5. 300 grams of the glycerin ester solution and 30 grams of aniline were heated to solution and the solution cooled to 10° C. The saturated gasoline solution was then heated with an excess of a saturated alcoholic oxalic acid solution, separated and water washed. 78% of H glycerin ester was recovered.

6. 300 grams of the glycerin ester solution, 30 grams of phenol and 25 grams of a saturated alcoholic solution of oxalic acid were heated to solution. 5 grams of water were then added, the mixture cooled to 0° C., the spent alcohol-phenol-oxalic acid mixture drawn off and the gasoline solution washed with 100 cc. of 80% alcohol followed by 100 cc. of water. The yield was 67% of H glycerin ester.

The above results may be summarized as follows:

Glycol esters free from iron were purified to a paler grade by means of furfural, resorcinol, resorcinol-oxalic acid mixture, resorcinol-sodium-hydrosulphite mixture, phenol, and aniline, and to a lesser degree by a saturated alcoholic solution of oxalic acid, a 50% solution of stannic chloride in alcohol or a saturated solution of sodium iodide in alcohol.

Glycerin esters free from iron were purified by phenol, furfural, resorcinol and mixtures of resorcinol with oxalic acid, boric acid or sodium hydrosulphite. While the use of resorcinol mixed with oxalic acid, boric acid and sodium hydrosulphite did not give substantially higher grades of ester, they increased the yield considerably.

Ethyl abietate free from iron was purified by means of furfural and resorcinol-oxalic acid mixture.

Glycol esters containing iron were purified to a paler grade by means of furfural followed by oxalic acid, resorcinol followed by oxalic acid, alcoholic solution of resorcinol followed by oxalic acid, a mixture of resorcinol and oxalic acid, phenol followed by oxalic acid, aniline followed by oxalic acid, a saturated alcoholic solution of oxalic acid and a mixture of phenol and sodium hydrosulphite.

It is to be noted that treatment with oxalic acid or sodium hydrosulphite may occur prior to, simultaneous with, or after the selective solvent in all cases except where such substances as furfural or aniline are used as the selective solvents. In the latter cases the treatment with oxalic acid or sodium hydrosulphite should precede or follow the treatment with a selective solvent in view of the undesired reactions which occur upon admixture.

Glycerin esters containing iron were purified to a paler grade by means of an alcoholic solution of sodium iodide followed by treatment with an alcoholic solution of oxalic acid. Purification was also obtained by alcohol-oxalic acid treatment followed by furfural, the use of a mixture of resorcinol and oxalic acid, treatment with an alcoholic solution of resorcinol and oxalic acid, aniline followed by oxalic acid and phenol followed by oxalic acid.

From the above it will be seen that rosin esters free from iron may be purified to a high degree by means of selective solvents, the use of reducing agents in certain cases increasing the yields. On the other hand, when iron is present, the selective solvents alone, while they produce refining to a certain extent, will in general not refine the rosin ester to an effective degree. In this case accordingly treatment with oxalic acid, boric acid, sodium hydrosulphite, or the like, is preferably resorted to to secure the desired degree of purification.

The procedure in accordance with my invention as it relates to the use of metallic halides is not specifically claimed herein, since such procedure forms the subject matter of and is claimed in my copending application Serial No. 742,149, filed August 30, 1934.

The procedure in accordance with my invention as it relates to the use of sulphur dioxide is not specifically claimed herein, since such procedure forms the subject matter of and is claimed in my copending application Serial No. 742,150, filed August 30, 1934.

What I claim and desire to protect by Letters Patent is:

1. The method of refining a rosin ester by the removal of color bodies therefrom which includes treating a solution of the ester with a substance capable of effecting separation of color bodies of the ester from the solution selected from the group consisting of furfural and furfuryl alcohol, and separating refined rosin ester from separated color bodies.

2. The method of refining a rosin ester according to claim 1 characterized by the fact that the rosin ester is treated in solution in a hydrocarbon solvent therefor.

3. The step in the method of refining a rosin ester containing iron and color bodies which includes treating the ester with a reagent capable of reducing iron in ferric form to the ferrous form.

4. The step in the method of refining a rosin ester according to claim 3 characterized by the fact that the rosin ester is treated in solution in a hydrocarbon solvent therefor.

5. The method of refining a rosin ester containing iron and color bodies which includes treating the ester with a reagent capable of reducing iron in ferric form to the ferrous form and simultaneously treating the ester with a substance capable of effecting separation of color bodies of the ester from a solution thereof selected from the group consisting of furfural and furfuryl alcohol and separating refined rosin ester from separated color bodies.

6. The method of refining an abietic acid ester containing latent color bodies, which includes subjecting the abietic acid ester in solution in an organic solvent to treatment with an organic solvent having a preferential affinity for the latent color bodies contained in the abietic acid ester and which is capable of substantial immiscibility with the solvent for the abietic acid ester and recovering refined abietic acid ester from the solvent for the abietic acid ester and also treating the abietic acid ester with a reagent capable of reducing iron in ferric form to the ferrous form.

7. The method of refining a rosin ester containing latent color bodies, which includes subjecting the rosin ester to treatment with two organic liquids, one primarily a solvent of the rosin ester and one primarily a solvent of latent color bodies contained in the rosin ester, the two liquids being substantially immiscible at normal temperatures, separating the two solutions formed and recovering refined rosin ester from the liquid primarily a solvent of the rosin ester and also treating the rosin ester with a reagent capable of reducing iron in ferric form to the ferrous form, the treatment with said reagent being simultaneous with the treatment of the rosin ester with one or both of the organic liquids.

8. The step in the method of refining a rosin ester containing iron and color bodies which includes treating the ester with oxalic acid.

9. The step in the method of refining a rosin ester containing iron and color bodies which includes treating the ester with an alkali metal hydrosulphite.

10. The method of refining a rosin ester containing iron and color bodies which includes treating the ester with oxalic acid and simultaneously treating the ester with a substance capable of effecting separation of color bodies of the ester from a solution thereof selected from the group consisting of furfural and furfuryl alcohol and separating refined rosin ester from separated color bodies.

11. The method of refining a rosin ester containing iron and color bodies which includes treating the ester with an alkali metal hydrosulphite and simultaneously treating the ester with a substance capable of effecting separation of color bodies of the ester from a solution thereof selected from the group consisting of furfural and furfuryl alcohol and separating refined rosin ester from separated color bodies.

12. The method of refining an abietic acid ester containing latent color bodies, which includes subjecting the abietic acid ester in solution in an organic solvent to treatment with an organic solvent having a preferential affinity for the latent color bodies contained in the abietic acid ester and which is capable of substantial immiscibility with the solvent for the abietic acid ester and recovering refined abietic acid ester from the solvent for the abietic acid ester and also treating the abietic acid ester with oxalic acid under conditions to reduce iron in ferric form to the ferrous form.

13. The method of refining an abietic acid ester containing latent color bodies, which includes subjecting the abietic acid ester in solution in an organic solvent to treatment with an organic solvent having a preferential affinity for the latent color bodies contained in the abietic acid ester and which is capable of substantial immiscibility with the solvent for the abietic acid ester and recovering refined abietic acid ester from the solvent for the abietic acid ester and also treating the abietic acid ester with an alkali metal hydrosulphite under conditions to reduce iron in ferric form to the ferrous form.

14. The method of refining a rosin ester containing latent color bodies, which includes subjecting the rosin ester to treatment with two organic liquids, one primarily a solvent of the rosin ester and one primarily a solvent of latent color bodies contained in the rosin ester, the two liquids being substantially immiscible at normal temperatures, separating the two solutions formed and recovering refined rosin ester from the liquid primarily a solvent of the rosin ester and also treating the rosin ester with oxalic acid, the treatment with said oxalic acid being simultaneous with the treatment of the rosin ester with one or both of the organic liquids.

15. The method of refining a rosin ester containing latent color bodies, which includes subjecting the rosin ester to treatment with two organic liquids, one primarily a solvent of the rosin ester and one primarily a solvent of latent color bodies contained in the rosin ester, the two liquids being substantially immiscible at normal temperatures, separating the two solutions formed and recovering refined rosin ester from the liquid primarily a solvent of the rosin ester and also treating the rosin ester with an alkali hydrosulphite, the treatment with said alkali metal hydrosulphite being simultaneous with the treatment of the rosin ester with one or both of the organic liquids.

JOSEPH N. BORGLIN.